US012767574B2

(12) United States Patent
Choi et al.

(10) Patent No.: US 12,767,574 B2
(45) Date of Patent: Oct. 20, 2026

(54) MOLD FOR MANUFACTURING GLASS CONTAINER CAPABLE OF CARVE MOLDING ON PARTING LINE

(71) Applicant: SMCG CO., LTD, Gwangju-si (KR)

(72) Inventors: Seung Ho Choi, Gwangju-si (KR); Byung Il Choi, Incheon (KR)

(73) Assignee: SMCG CO., LTD, Gwangju-si (KR)

( * ) Notice: Subject to any disclaimer, the term of this patent is extended or adjusted under 35 U.S.C. 154(b) by 14 days.

(21) Appl. No.: 18/994,185

(22) PCT Filed: Aug. 18, 2022

(86) PCT No.: PCT/KR2022/012348
§ 371 (c)(1),
(2) Date: Jan. 14, 2025

(87) PCT Pub. No.: WO2024/038928
PCT Pub. Date: Feb. 22, 2024

(65) Prior Publication Data
US 2026/0015278 A1 Jan. 15, 2026

(51) Int. Cl.
*C03B 11/10* (2006.01)
*C03B 9/347* (2006.01)

(52) U.S. Cl.
CPC .............. *C03B 11/10* (2013.01); *C03B 9/347* (2013.01); *C03B 2215/41* (2013.01); *C03B 2215/68* (2013.01)

(58) Field of Classification Search
None
See application file for complete search history.

(56) References Cited

FOREIGN PATENT DOCUMENTS

| | | | |
|---|---|---|---|
| CN | 104609703 | 5/2015 | |
| EP | 2551244 | 1/2013 | |
| JP | 03295821 | 12/1991 | |
| JP | H10217316 | 8/1998 | |
| JP | 3977012 | 9/2007 | |
| KR | 101266155 | 5/2013 | |
| KR | 101266155 B1 * | 5/2013 | ............. B29C 49/52 |
| KR | 20140044088 | 4/2014 | |
| KR | 20160086821 | 7/2016 | |
| KR | 20180012024 | 2/2018 | |
| KR | 20180023170 | 3/2018 | |
| KR | 20190013114 | 2/2019 | |
| KR | 20210154455 A * | 12/2021 | ............. A45D 40/00 |
| KR | 20220152407 | 11/2022 | |

OTHER PUBLICATIONS

KR104011402B1 EPO Machine Translation equivalent to KR20140044088. Retrieved Apr. 23, 2026. (Year: 2026).*
KR-20210154455-A Machine Translation by Clarivate Analytics retrieved Apr. 23, 2026. (Year: 2026).*

* cited by examiner

*Primary Examiner* — Lisa L Herring
(74) *Attorney, Agent, or Firm* — LEX IP MEISTER, PLLC

(57) ABSTRACT

The present disclosure relates to a mold for manufacturing a glass container including a left mold and a right mold, wherein the left mold includes a left fixed mold; and a left separated mold positioned on a side surface of the left fixed mold, the right mold includes a right fixed mold; and a right separated mold positioned on a side surface of the right fixed mold, the left separated mold is movable forwardly and backwardly while the left fixed mold is stationary, and the right separated mold is movable forwardly and backwardly while the right fixed mold is stationary.

3 Claims, 6 Drawing Sheets

MOLD FOR MANUFACTURING GLASS CONTAINER CAPABLE OF CARVE MOLDING ON PARTING LINE

TECHNICAL FIELD

The present disclosure relates to a mold for manufacturing a glass container capable of carve molding on a parting line, and more particularly, to a mold for manufacturing a glass container capable of molding carvings uniformly over the entire 360-degree outer surface of a glass container in order to solve the problem of the related art in which carvings molded at a parting line, which is a portion in which a left mold and a right mold are closely attached or separated, in the entire outer surface of the glass container, are scratched while the left mold and the right mold rotate to be separated, and thus carvings cannot be molded in the parting line portion of the outer surface of the glass container, during a process of forming carvings protruding to a certain length on the outer surface of the glass container to enhance the aesthetics of the glass container.

BACKGROUND ART

Cosmetic containers may generally be manufactured from synthetic resin or glass.

The advantage of a cosmetic glass container made of glass rather than synthetic resin is that the deterioration of cosmetics may be minimized, and thus the cosmetics accommodated in the cosmetic glass container may be stored for a long time without deterioration.

Furthermore, in terms of environmental issues of cosmetic containers, glass materials are more recyclable than synthetic resin materials, which may minimize the burden on the natural environment when disposed. In addition, it is known that less environmentally harmful substances are emitted from glass materials than synthetic resin materials during manufacturing.

Furthermore, cosmetic containers made of glass materials are aesthetically better than those made of synthetic resin materials. In other words, the aesthetics that cannot be felt from synthetic resin materials or visual effects are expressed in glass materials, and thus they are preferred as cosmetic containers to add a sense of luxury to cosmetics.

Meanwhile, a disadvantage of glass cosmetic containers made of glass materials is that, unlike synthetic resin materials that may be easily molded into various shapes of containers, glass materials have limitations in molding shapes due to the characteristics of glass materials. In other words, in order to manufacture a cosmetic container that may implement a desired function, synthetic resin materials have a wide range of molding that may be done without any restrictions in manufacturing cosmetic containers, but in the case of glass containers, the range of molding that may be done is very narrow in reality when manufacturing cosmetic containers that may implement a desired function.

In the case of glass cosmetic containers, the aesthetics of the cosmetic container may be enhanced due to the luxuriousness of the glass material, and in addition, interest in molding glass containers has continuously increased in order to enhance the aesthetics of the glass containers through additional decoration or molding, but as described above, the range of molding that may be done with glass materials is very narrow, so additional molding or decoration is not easily made.

In particular, in order to uniformly mold a plurality of carvings protruding to a certain length on the outer surface of the glass container to enhance the aesthetic appeal of a glass container, the related art is inevitably limited due to the characteristics of the glass material described above.

Referring to FIG. 1, the limitations of the related art are described. During the process of molding carvings uniformly protruding at a constant interval with a constant length on the outer surface of the glass container, the left mold and the right mold, while being separated at a certain rotation angle, come into contact with the carvings molded in the parting line portion, which is the portion in which the left mold and the right mold are combined or separated in the entire outer surface of the glass container, which causes scratches on the carvings molded at the parting line. As a result, carvings cannot be molded, so the parting line portion is inevitably molded to be plain.

In other words, carvings cannot be molded uniformly 360 degrees around the outer surface of the glass container and may only be molded in the remaining portions except for the plain parting line portion, so the enhancement of aesthetics is limited.

Therefore, a mold for manufacturing glass containers that may mold carvings uniformly 360 degrees around the outer surface of the glass container is urgently needed.

(Patent Document 1) KR20-0133570 B

DISCLOSURE

Technical Problem

In order to solve the problems of the related art described above, the present disclosure proposes a mold for manufacturing a glass container, capable of uniformly molding carvings over the entire 360-degree outer surface of a glass container, including a parting line, to enhance the aesthetics when manufacturing a glass container.

Technical Solution

In order to solve the problems of the related art described above, a mold for manufacturing a glass container includes a left mold 100 and a right mold 200, wherein the left mold 100 includes a left fixed mold 120; and a left separated mold 130 positioned on a side surface of the left fixed mold 120, the right mold 200 includes a right fixed mold 220; and a right separated mold 230 positioned on a side surface of the right fixed mold 220, the left separated mold 130 is movable forwardly and backwardly while the left fixed mold 120 is stationary, and the right separated mold 230 is movable forwardly and backwardly while the right fixed mold 220 is stationary.

Preferably, a left driving pin through-hole 132 is formed in a vertical direction in the left separated mold 130, and a right driving pin through-hole 232 is formed in the vertical direction in the right separated mold 230, the left driving pin 150 is movable up and down in a state in which the left driving pin 150 penetrates through the left driving pin through-hole 132, and the right driving pin 250 is movable up and down in a state in which the right driving pin 250 penetrates through the right driving pin through-hole 232.

Preferably, the left driving pin 150 includes a left driving first guide portion 152; a left driving second guide portion 154 positioned below the left driving first guide portion 152 at a constant interval in the vertical direction; and a left driving connection portion 153 connecting the left driving first guide portion 152 and the left driving second guide portion 154, the right driving pin 250 includes a right driving first guide portion 252; a right driving second guide portion 254 positioned below the right driving first guide portion 252 at a constant interval in the vertical direction; and a right driving connection portion 253 connecting the right driving first guide portion 252 and the right driving second guide portion 254, an upper end surface of the left driving connection portion 153 is connected to a portion of a lower end surface of the left driving first guide portion 152 but is connected to a portion of the lower end surface of the left driving first guide portion 152 that is inclined forwardly, a lower end surface of the left driving connection portion 153 is connected to a portion of the upper end surface of the left driving second guide portion 154 but is connected to a portion of the upper end surface of the left driving second guide portion 154 that is inclined backwardly, an upper end surface of the right driving connection portion 253 is connected to a portion of a lower end surface of the right driving first guide portion 252 but is connected to a portion of the lower end surface of the right driving first guide portion 252 that is inclined forwardly, and a lower end surface of the right driving connection portion 253 is connected to a portion of the upper end surface of the right driving second guide portion 254 but is connected to a portion of the upper end surface of the right driving second guide portion 254 that is inclined backwardly.

Preferably, the left mold 100 further includes a left bottom portion 140 extending downwardly from the left fixed mold 120 and positioned below the left fixed mold 120 and the left separated mold 130, the right mold 200 further includes a right bottom portion 240 extending downwardly from the right fixed mold 220 and positioned below the right fixed mold 220 and the right separated mold 230, a left driving pin bottom through-hole 142 is formed in the left bottom portion 140 in the vertical direction and the left driving second guide portion 154 is inserted into the left driving pin bottom through-hole 142 so as to be movable up and down, the lower end surface of the left driving second guide portion 154 is maintained in close contact with a first elastic member 160 in a state in which the first elastic member 160 is positioned below the left driving pin bottom through-hole 142, a right driving pin bottom through-hole 242 is formed in the right bottom portion 240 in the vertical direction, so that the right driving second guide portion 254 is inserted into the right driving pin bottom through-hole 242 so as to be movable up and down, and the lower end surface of the right driving second guide portion 254 is maintained in close contact with a second elastic member 260 in a state in which the second elastic member 260 is positioned below the right driving pin bottom through-hole 242.

Preferably, the left separated mold 130 is moved forwardly and backwardly in a direction toward an inner center formed in a state in which the left mold 100 and the right mold 200 are combined, and the right separated mold 230 is moved forwardly and backwardly in the direction toward the inner center formed in the state in which the left mold 100 and the right mold 200 are combined, the left driving connection portion 153 is formed in a polygonal shape, a portion of the left driving pin through-hole 132 formed on an inner side of the left separated mold 130 is configured in a shape corresponding to the polygonal shape of the left driving connection portion 153, the right driving connection portion 253 is formed in a polygonal shape, a portion of the right driving pin through-hole 232 formed on an inner side of the right separated mold 230 is configured in a shape corresponding to the polygonal shape of the right driving connection portion 253, the left separated mold 130 is positioned on both sides of the left fixed mold 120, and the right separated mold 230 is positioned on both sides of the right fixed mold 220.

Advantageous Effects

Due to the aforementioned solution to the problems, after carving molding is performed in a mold, during the process of separating the left mold and the right mold, the left mold and the right mold are separated in a state in which a left separated mold and a right separated mold, which correspond to a parting line mold in which the parting line of the glass container is molded among the left mold and the right mold, are moved backwardly, but in this case, the left mold and the right mold rotate to be separated in a state in which the protrusions formed on the inner surface of the mold necessary for the carving molding are moved backwardly to a certain degree, and therefore, even if a carving is molded on the parting line of the outer surface of the glass container, problems such as scratches do not occur on the carving during the process of separating the left mold and the right mold while rotating, so that the carving may be uniformly molded 360 degrees over the entire outer surface of the glass container, thereby enhancing the aesthetic appeal of the glass container.

DESCRIPTION OF DIAGRAMS

BEST MODE

Hereinafter, embodiments of the present disclosure will be described with reference to the accompanying diagrams. In the diagrams, the sizes or shapes of elements may be exaggeratedly illustrated for clarity and convenience of description. Moreover, the terms used henceforth have been defined in consideration of the functions of the present disclosure, and may be altered according to the intent of a user or operator, or conventional practice. Therefore, the terms should be defined on the basis of the entire content of the specification.

Figure 1:
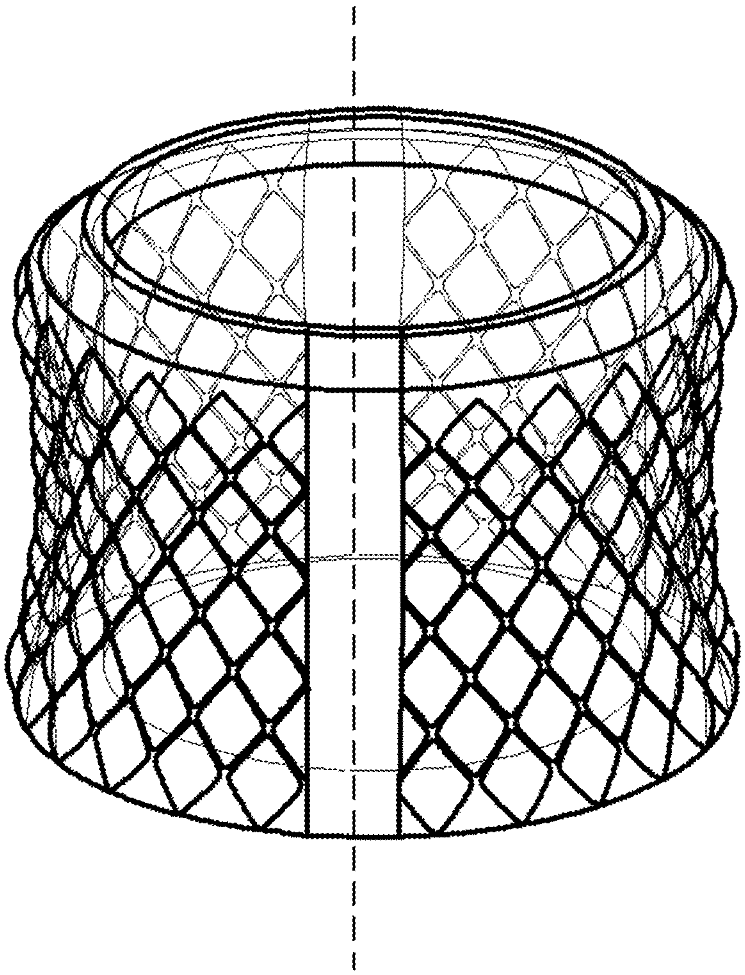
FIG. 1 is a diagram schematically illustrating a glass container manufactured according to the related art.
Figure 2:
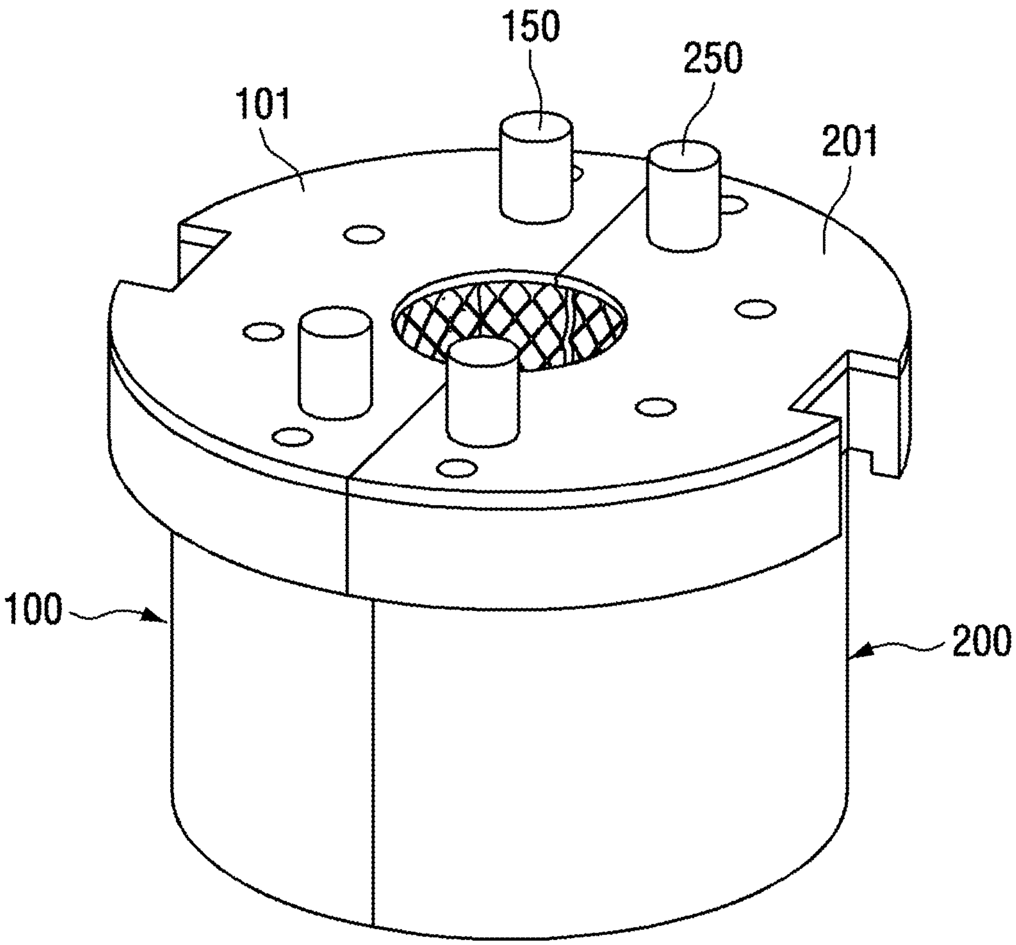
FIG. 2 is a diagram schematically illustrating a mold for manufacturing a glass container according to the present disclosure.
Figure 3:
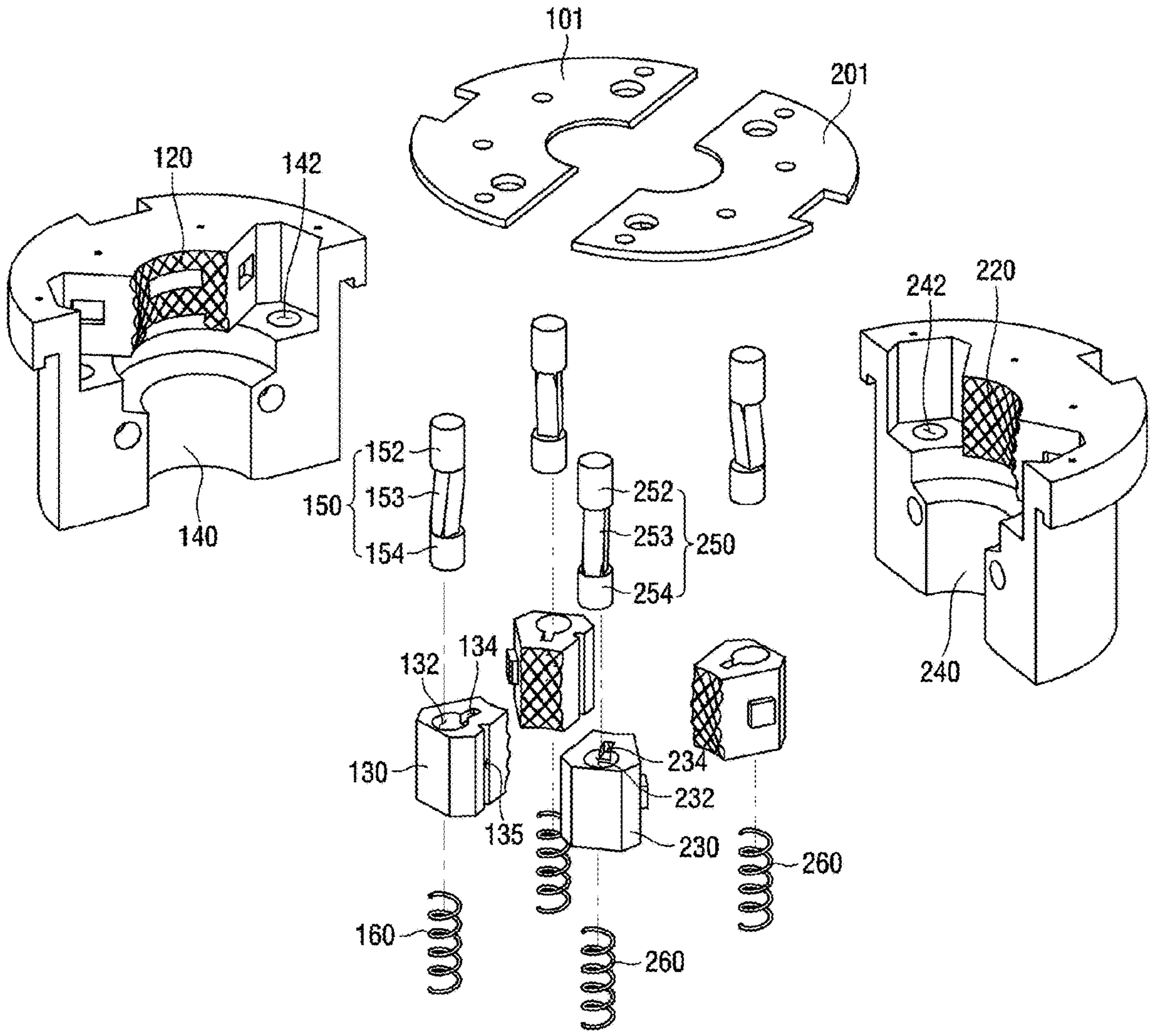
FIGS. 3 and 4 are exploded perspective views of a mold for manufacturing a glass container according to the present disclosure.
Figure 4:
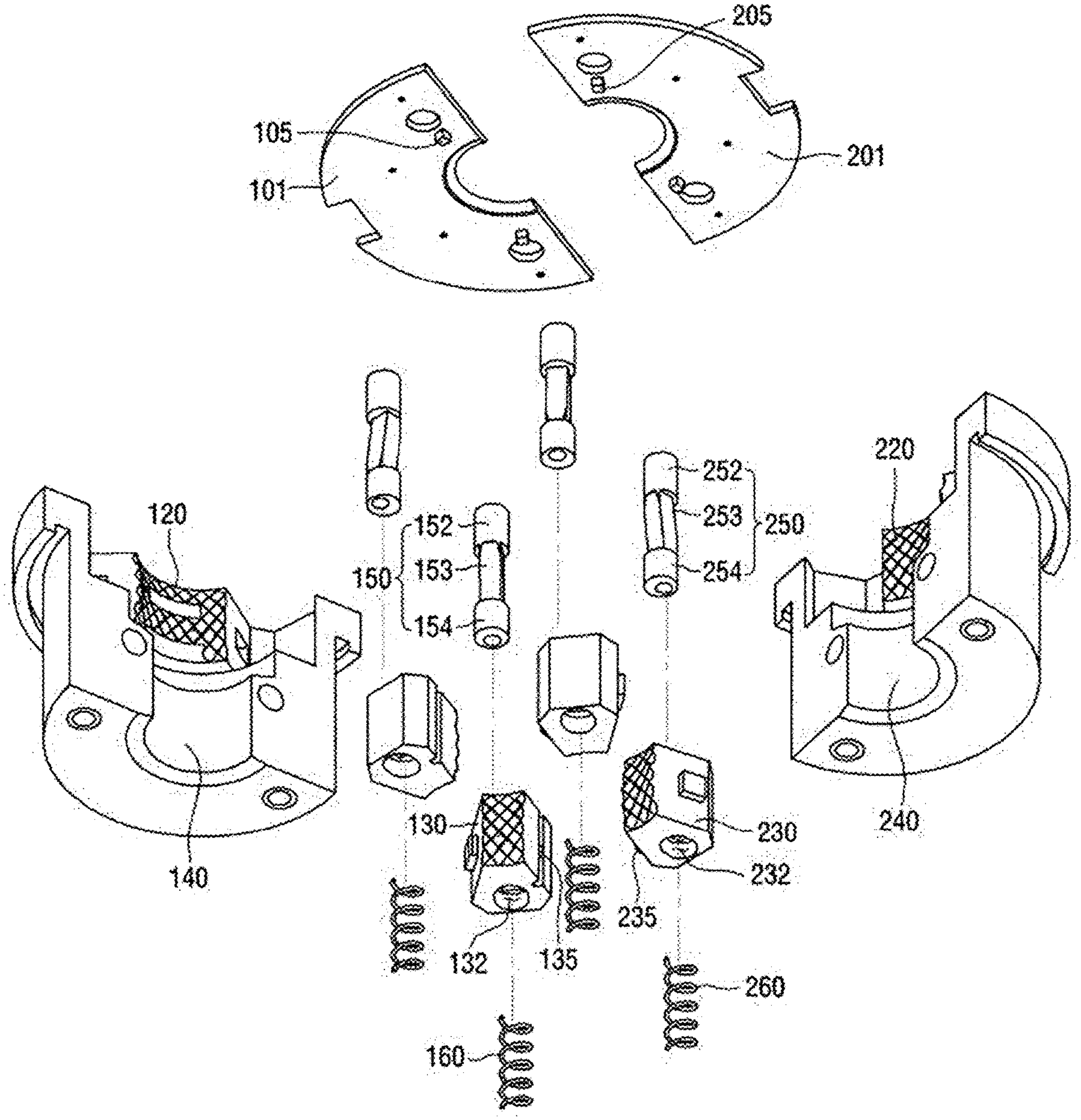

Descriptions are given with reference to FIGS. 2 to 4.

A mold for manufacturing a glass container according to the present disclosure includes a left mold 100 and a right mold 200.

A primary molded product F is in a state in which a glass melt is primarily molded into a required shape, such as a space in which cosmetics are accommodated, while being dropped into a primary mold of a certain shape.

A secondary molding process in which a secondary molded product S is molded may be a process in which air is blown into the inside of the primary molded product F so that the primary molded product F in a heated state expands inside the left mold 100 and the right mold 200 for the secondary molding, thereby forming a secondary molded product to fit the shape of the inner surface of the left mold 100 and the right mold 200 or a process in which carvings are molded on the outer surface of the primary molded product F in order to enhance the aesthetics of the glass container while the primary molded product F is positioned inside the mold for manufacturing a glass container according to the present disclosure and the left mold 100 and the right mold 200 are in close contact. It goes without saying that the two processes described above may be carried out separately or simultaneously.

The secondary molded product S may be cooled so that a cosmetic glass container may be finally manufactured.

The inner surfaces of the left mold 100 and the right mold 200 may be configured in a shape corresponding to the shape of an outer surface of the glass container to be finally molded.

The left mold 100 may include a left fixed mold 120, a left separated mold 130, and a left bottom portion 140.

The left fixed mold 120 is a portion in which the outer surface of the glass container is molded, and an inner surface of the left fixed mold 120 may be configured in a shape corresponding to the shape of the outer surface of the glass container. Accordingly, the inner surface of the left fixed mold 120 may be configured in a shape corresponding thereto so that a plurality of carvings may be uniformly molded on the outer surface of the glass container.

The left bottom portion 140 may extend downwardly from the left fixed mold 120 and may be positioned below the left fixed mold 120 and the left separated mold 130. In other words, the left bottom portion 140 may be formed in a form that supports the left fixed mold 120 and the left separated mold 130 from below. In the glass container, the portion formed by the left bottom portion 140 may be a lower portion of the glass container in which carvings are not formed.

The left separated mold 130 may be positioned on the side of the left fixed mold 120 while being supported by the left bottom portion 140. The left separated mold 130 may be positioned on each of both sides of the left fixed mold 120. Accordingly, the left mold 100 may include three separate molds including the left fixed mold 120 positioned above the left bottom portion 140 and two left separated molds 130 positioned on both sides of the left fixed mold 120.

The left separated mold 130 may be configured to move forwardly and backwardly while the left fixed mold 120 is stationary while positioned above the left bottom portion 140. That is, a forwardly moved state is a state in which the left mold 100 and the right mold 200 are in close contact and carvings are molded on the entire 360-degree outer surface of the glass container, and a backwardly moved state may be a state before the left mold 100 and the right mold 200 are separated at a certain rotation angle in a state in which the carvings are molded. A detailed description will be given below.

The right mold 200 may include a right fixed mold 220, a right separated mold 230, and a right bottom portion 240.

The right fixed mold 220 is a portion in which the outer surface of the glass container is molded, and a inner surface of the right fixed mold 220 is configured in a shape corresponding to the shape of the outer surface of the glass container. Accordingly, the inner surface of the right fixed mold 220 may be configured in a shape corresponding thereto so that a plurality of carvings may be uniformly molded on the outer surface of the glass container.

The right bottom portion 240 may extend downwardly from the right fixed mold 220 and may be positioned below the right fixed mold 220 and the right separated mold 230. In other words, the right bottom portion 240 may be formed in a shape that supports the right fixed mold 220 and the right separated mold 230 from below. In the glass container, the portion formed in the right bottom portion 240 may be a lower portion of the glass container in which the carvings are not molded.

The right separated mold 230 may be positioned on the side of the right fixed mold 220 while being supported by the right bottom portion 240. The right separated mold 230 may be positioned on both sides of the right fixed mold 220. Accordingly, the right mold 200 may include three separate molds including the right fixed mold 220 positioned above the right bottom portion 240 and two right separated molds 230 positioned on both sides of the right fixed mold 220.

The right separated mold 230 may be configured to be able to move forwardly and backwardly while the right fixed mold 220 is stationary while positioned above the right bottom portion 240. That is, the forwardly moved state is a state in which the left mold 100 and the right mold 200 are in close contact and carvings are molded on the entire 360-degree outer surface of the glass container, and the backwardly moved state may be a state before the left mold 100 and the right mold 200 are separated at a certain rotation angle in the state in which the carvings are molded. A detailed description will be given below.

Accordingly, in the mold for manufacturing a glass container according to the present disclosure, the mold corresponding to the mold in which carvings are molded on the outer surface of the glass container may include a total of six molds including the left fixed mold 120, two left separated molds 130, the right fixed mold 220, and two right separated molds 230.

The left mold 100 may further include a left driving pin 150 and a first elastic member 160.

In the left separated mold 130, a left driving pin through-hole 132 is formed in a vertical direction, and the left driving pin 150 may move up and down while penetrating through the left driving pin through-hole 132.

In the left driving pin 150, a left driving first guide portion 152 may be inserted into an upper portion of the left driving pin through-hole 132, a left driving connection portion 153 extending downwardly from the left driving first guide portion 152 may be positioned inside the left driving pin through-hole 132, and a left driving second guide portion 154 extending downwardly from the left driving connection portion 153 may be inserted into a lower portion of the left driving pin through-hole 132, and in this state, the left driving pin 150 may move up and down.

At this time, a left driving pin bottom through-hole 142 is formed in the left bottom portion 140 in the vertical direction, so that the left driving second guide portion 154 described above may be configured to move up and down while being inserted into the left driving pin bottom through-hole 142. Even when the left driving pin 150 is moved up as much as possible, a portion of the left driving second guide portion 154 may be inserted into the lower portion of the left driving pin through-hole 132 and the remaining portion may still be inserted into the left driving pin bottom through-hole 142.

Accordingly, the left driving pin through-hole 132 and the left driving pin bottom through-hole 142 may be connected in the vertical direction.

The first elastic member 160 may be positioned at the low part of the left driving pin bottom through-hole 142, and accordingly, a lower end surface of the left driving pin bottom through-hole 142, which is closed by a certain unit, may be in close contact with the first elastic member 160.

Therefore, in a state in which the left driving pin 150 has moved upwardly by elastic force of the first elastic member 160, when an external force is applied to the left driving pin 150 while a blower head is in close contact with the upper surfaces of the left mold 100 and the right mold 200, the left driving pin 150 may be configured to move downwardly by the external force.

When the blower head is separated from the upper surfaces of the left mold 100 and the right mold 200, the left driving pin 150 may be moved upwardly by the elastic force of the first elastic member 160. In this manner, the left driving pin 150 may be moved up and down while being inserted into the left driving pin through-hole 132 and the left driving pin bottom through-hole 142.

In the left driving pin 150, the left driving second guide portion 154 is inserted into the left driving pin bottom through-hole 142 in a fixed state, and the left driving pin 150 may be configured to only be moved up and down.

The left mold 100 may include a left guide cover 101 positioned on the upper surfaces of the left fixed mold 120 and the left separated mold 130. The left guide cover 101 has a hole formed through which the left driving first guide portion 152 penetrates, so that the left driving pin 150 penetrates the fixed left guide cover 101, and similarly, the left driving pin 150 may be configured to only move up and down by this left guide cover 101.

However, since the left separated mold 130 is blocked from moving upwardly by the left guide cover 101, the left separated mold 130 may be configured to only move forwardly and backwardly according to a vertical movement of the left driving pin 150. That is, as the left driving pin 150 is moved upwardly or downwardly in a state in which the left separated mold 130 is not moved up and down, the left separated mold 130 may be positioned in a forwardly or backwardly moved state depending on where the left driving connection portion 153 is positioned inside the left driving pin through-hole 132 of the left separated mold 130.

The driving relationship between the left driving connection portion 153 and the left separated mold 130 according to the vertical movement of the left driving pin 150 will be described below.

The right mold 200 may further include a right driving pin 250 and a second elastic member 260.

In the right separated mold 230, a right driving pin through-hole 232 is formed in a vertical direction, and the right driving pin 250 may move up and down while penetrating through the right driving pin through-hole 232.

In the right driving pin 250, a right driving first guide portion 252 may be inserted into an upper portion of the right driving pin through-hole 232, a right driving connection portion 253 extending downwardly from the right driving first guide portion 252 may be positioned inside the right driving pin through-hole 232, and a right driving second guide portion 254 extending downwardly from the right driving connection portion 253 may be inserted into a lower portion of the right driving pin through-hole 232, and in this state, the right driving pin 250 may move up and down.

At this time, a right driving pin bottom through-hole 242 is formed in the right bottom portion 240 in a vertical direction, so that the right driving second guide portion 254 described above may be configured to move up and down while being inserted into the right driving pin bottom through-hole 242. Even when the right driving pin 250 is moved up as much as possible, a portion of the right driving second guide portion 254 may be inserted into the lower portion of the right driving pin through-hole 232, and the remaining portion may still be inserted into the right driving pin bottom through-hole 242.

Accordingly, the right driving pin through-hole 232 and the right driving pin bottom through-hole 242 may be connected in the vertical direction.

The second elastic member 260 may be positioned at the low part of the right driving pin bottom through-hole 242, and accordingly, a lower end surface of the right driving pin bottom through-hole 242, which is closed by a certain unit, may be in close contact with the second elastic member 260.

Therefore, in a state in which the right driving pin 250 has moved upwardly by elastic force of the second elastic member 260, when an external force is applied to the right driving pin 250 while the blower head is in close contact with the upper surfaces of the left mold 100 and the right mold 200, the right driving pin 250 may be configured to move downwardly by the external force.

When the blower head is separated from the upper surfaces of the left mold 100 and the right mold 200, the right driving pin 250 may move upwardly due to the elastic force of the second elastic member 260. In this manner, the right driving pin 250 may move up and down while being inserted into the right driving pin through-hole 232 and the right driving pin bottom through-hole 242.

In the right driving pin 250, the right driving second guide portion 254 is inserted into the right driving pin bottom through-hole 242 in a fixed state, and thus, the right driving pin 250 may be configured to only move up and down.

The right mold 200 may include a right guide cover 201 positioned on the upper surfaces of the right fixed mold 120 and the right separated mold 230. The right guide cover 201 has a hole formed through which the right driving first guide portion 252 penetrates, so that the right driving pin 250 penetrates the fixed right guide cover 201, and similarly, the right driving pin 250 may be configured to only move up and down by the right guide cover 201.

However, since the right separated mold 230 is blocked from moving upwardly by the right guide cover 201, the right separated mold 230 may be configured to only move forwardly and backwardly according to the vertical movement of the right driving pin 250. That is, as the right driving pin 250 is moved upwardly or downwardly in a state in which the right separated mold 230 is not moved up and down, the right separated mold 230 may be positioned in a forwardly or backwardly moved state depending on where the right driving connection portion 253 is positioned inside the right driving pin through-hole 232 of the right separated mold 230.

The driving relationship between the right driving connection portion 253 and the right separated mold 230 according to the vertical movement of the right driving pin 250 will be described below.

The configuration of the left driving pin 150 will be described.

As described above, the left driving pin 150 may include the left driving first guide portion 152, the left driving second guide portion 154 positioned below the left driving first guide portion 152 at a certain distance in the vertical direction, and the left driving connection portion 153 connecting the left driving first guide portion 152 and the left driving second guide portion 154.

More specifically, an upper end surface of the left driving connection portion 153 is connected to a portion of the lower end surface of the left driving first guide portion 152 but may be connected to a portion of the lower end surface of the left driving first guide portion 152 that is tilted toward the front. The lower end surface of the left driving connection portion 153 is connected to a portion of the upper end surface of the left driving second guide portion 154 but may be connected to a portion of the upper end surface of the left driving second guide portion 154 that is tilted toward the rear.

That is, the left driving first guide portion 152 and the left driving second guide portion 154 may be positioned on the same vertical line, but the left driving connection portion 153 may be configured to connect the left driving first guide portion 152 and the left driving second guide portion 154 in an inclined state at a certain angle from the vertical line.

The left driving connection portion 153 may have any shape but is preferably formed in a polygonal shape. Accordingly, it goes without saying that a portion of the left driving pin through-hole 132 formed inside the left separated mold 130 may be formed in a shape corresponding to the polygonal shape of the left driving connection portion 153.

Figure 5:
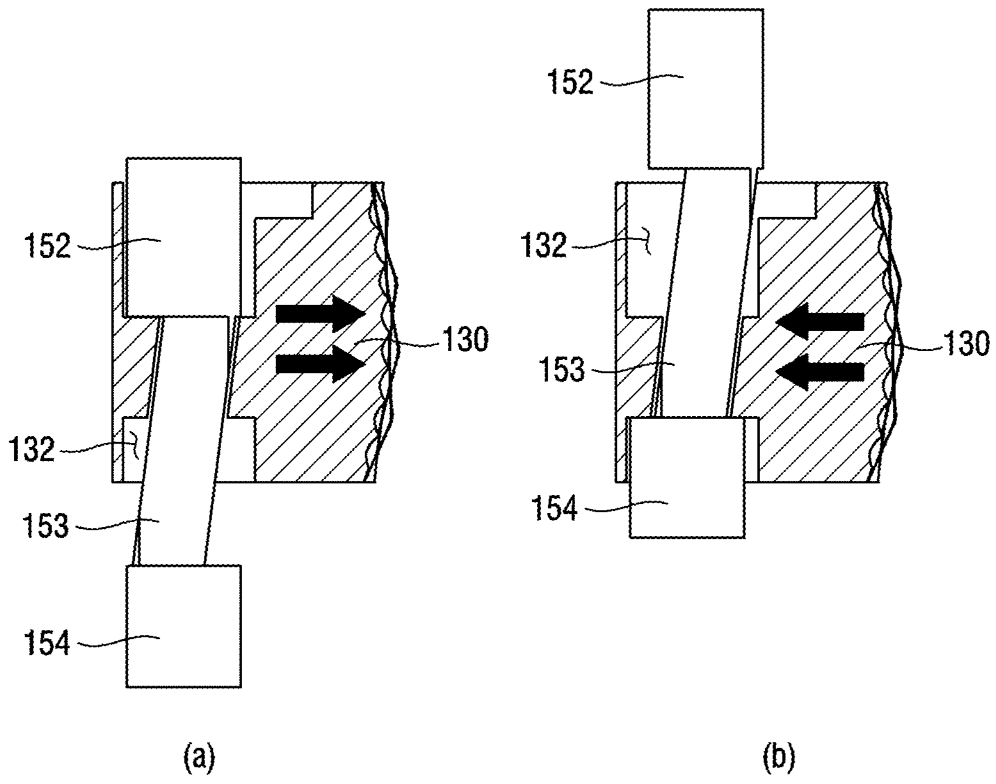
FIG. 5 is a diagram schematically illustrating forwardly and backwardly movement states of a left separated mold and a right separated mold in a mold for manufacturing a glass container according to the present disclosure.

Accordingly, as the left driving connection portion 153 moves downwardly, the position of the inside of the left driving pin through-hole 132 corresponds to the upper portion of the left driving connection portion 153, and the upper portion of the left driving connection portion 153 is positioned to be inclined forwardly and is positioned to be inclined in an inward direction (i.e., toward the center of the mold) of the left separated mold 130, and thus, the left separated mold 130 positioned at the upper portion of the left driving connection portion 153 may naturally have been moved forwardly ((a) of FIG. 5).

Meanwhile, as the left driving connection portion 153 moves upwardly, the position of the inside of the left driving pin through-hole 132 corresponds to the lower portion of the left driving connection portion 153, and the lower portion of the left driving connection portion 153 is positioned to be inclined backwardly and is positioned to be inclined in an outward direction (i.e., away from the center of the mold), and thus, the left separated mold 130 positioned at the lower portion of the left driving connection portion 153 may naturally have been moved backwardly ((b) of FIG. 5).

That is, depending on the vertical movement of the left driving pin 150, the left separated mold 130 may be moved forwardly or backwardly in the direction toward the inner center formed when the left mold 100 and the right mold 200 are combined.

A description of the right driving pin 250 is replaced with the description of the state in which the left driving first guide portion 152, the left driving connection portion 153, and the left driving second guide portion 154 in the description of the left driving pin 150 described above are changed to the right driving first guide portion 252, the right driving connection portion 253, and the right driving second guide portion 254, respectively.

Furthermore, a description of the relationship between the components of the right driving pin 250 and the right separated mold 230 is replaced with the description of the state in which the left driving pin 150 and the left separated mold 130 in the description of the relationship between the components of the left driving pin 150 and the left separated mold 130 described above are changed to the right driving pin 250 and the right separated mold 230, respectively.

Accordingly, according to the vertical movement of the right driving pin 250, the right separated mold 230 may move forwardly or backwardly in the direction toward the inner center formed in a state in which the left mold 100 and the right mold 200 are combined.

A process of manufacturing a glass container using a mold for manufacturing a glass container according to the present disclosure is described with reference to FIG. 6.

Figure 6:
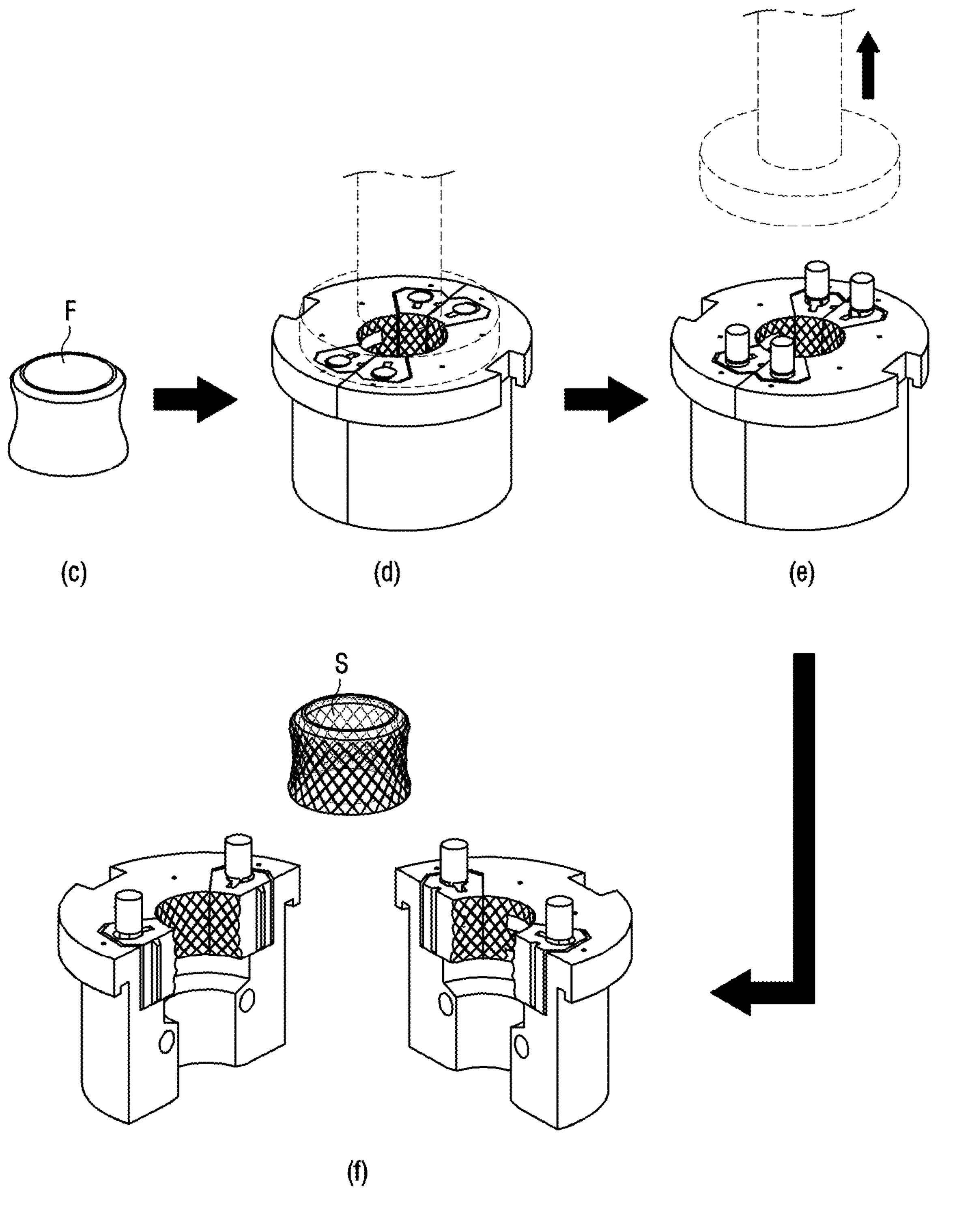
FIG. 6 is a diagram schematically illustrating a step of manufacturing a glass container according to a mold for manufacturing a glass container according to the present disclosure.

(c) of FIG. 6 is a diagram showing the primary molded product F in a state in which a glass melt is primarily molded into a required shape, such as a space in which cosmetics are accommodated, while being dropped into the primary mold of a certain shape. The outer surface of the primary molded product F is in a state in which carvings are not molded yet.

(d) of FIG. 6 is a diagram showing a state in which the blower head is seated on the upper surfaces of the left mold 100 and the right mold 200 in a state in which the primary molded product F is positioned on the inner side of a hollow space formed in a state in which the left mold 100 and the right mold 200 are in close contact.

It goes without saying that the inner surface of the left mold 100 and the inner surface of the right mold 200 may be configured in a shape corresponding to the shape of carvings to be molded on the outer surface of the glass container. Furthermore, since the left driving pin 150 and the right driving pin 250 have been moved downwardly due to the mounting of the blower head, the inner side of the left separated mold 130 and the right separated mold 230 are positioned at the upper portions of the left driving connection portion 153 and the right driving connection portion 253, and as a result, the left separated mold 130 and the right separated mold 230 have been advanced toward the inner center of the hollow. In this state, the inner surfaces of the left fixed mold 120, the two left separated molds 130, the right fixed mold 220, and the two right separated molds 230 are arranged in a continuous manner to correspond to the shape of the outer surface of the glass container.

In this case, the left separated mold 130 and the right separated mold 230 are moved forwardly in a backwardly state, and thus, the left separated mold 130 and the right separated mold 230 should be moved forwardly toward the center of the inner side of the hollow portion of the mold described above so that the inner surfaces of the six molds may be continuously connected.

In the present disclosure, in order for the left separated mold 130 and the right separated mold 230 to be guided to move forwardly toward the inner center of the hollow of the mold as described above, a left separated mold guide recess 134 and a right separated mold guide recess 234 may be formed on the upper surface of the left separated mold 130 and the upper surface of the right separated mold 230, a left separated mold guide protrusion 105 may be formed on the lower surface of the left guide cover 101 at a position corresponding to the left separated mold guide recess 134, and a right separated mold guide protrusion 205 may be formed on the lower surface of the right guide cover 201 at a position corresponding to the right separated mold guide recess 234.

Accordingly, in a state in which the left separated mold guide protrusion 105 and the right separated mold guide protrusion 205 are inserted into the left separated mold guide recess 134 and the right separated mold guide recess 234, respectively, the left separated mold 130 and the right separated mold 230 are moved forwardly or backwardly, so that the forward or backward movement of the left separated mold 130 and the right separated mold 230 may be guided.

Furthermore, the left separated mold 130 positioned on both sides of the left fixed mold 120 and the right separated mold 230 positioned on both sides of the right fixed mold 220 may be positioned in close contact with each other. That is, when the left mold 100 and the right mold 200 are in close contact, the left separated mold 130 and the right separated mold 230 that are in close contact with each other should be moved forwardly or backwardly at the same time.

Therefore, in order for the left separated mold 130 and the right separated mold 230 to be moved simultaneously while the left mold 100 and the right mold 200 are in close contact, a mounting recess 135 may be formed on a side surface of the left separated mold 130, and a mounting protrusion 235 may be formed on a side surface of the right separated mold 230 corresponding to the mounting recess 135 of the left separated mold 130.

In a state in which the left mold 100 and the right mold 200 are in close contact and the mounting protrusion 235 is mounted in the mounting recess 135, the left separated mold 130 and the right separated mold 230 are moved forwardly and backwardly, so that the left separated mold 130 and the right separated mold 230 may be moved forwardly and backwardly at the same time.

In (e) of FIG. 6, in a state in which the blower head is removed from the upper surfaces of the left mold 100 and the right mold 200, the left driving pin 150 and the right driving pin 250 are moved upwardly by the elastic force of the first elastic member 160 and the second elastic member 260, so that the inner sides of the left separated mold 130 and the right separated mold 230 are positioned at the lower portions of the left driving connection portion 153 and the right driving connection portion 253, and as a result, the left separated mold 130 and the right separated mold 230 are moved backwardly. In this state, the left fixed mold 120 and the right fixed mold 220 have been moved forwardly relatively, and the two left separated molds 130 and the two right separated molds 230 have been moved backwardly relatively. The inner surfaces of the left fixed mold 120 and the right fixed mold 220 and the inner surfaces of the two left separated molds 130 and the two right separated molds 230 are not continuous.

(f) of FIG. 6 is a diagram showing a state in which the left mold 100 and the right mold 200 are separated while carvings are molded on the entire 360-degree outer surface of the glass container. (f) of FIG. 6 is a diagram showing the left guide cover 101 and the right guide cover 201 removed in order to show the forward and backward movement of the left separated mold 130 and the right separated mold 230 according to the positions of the left driving pin 150 and the right driving pin 250.

In the related art, during the process of separating the left mold and the right mold, a protruding portion formed in the mold portion corresponding to the parting line of the glass container in the left mold was rotated while in contact with the carvings already molded on the parting line of the glass container during the process of separation while rotating, and there was a problem in that scratches, etc. occurred on the carvings as they were rotated while in contact with the carvings already molded on the parting line and protruded to a certain length. The same applies to the right mold.

However, in the present disclosure, in a state in which carvings are molded on the outer surface of the glass container, before the left mold 100 and the right mold 200 are separated while rotating, the left separated mold 130 and the right separated mold 230, which are molds corresponding to the parting line, are rotated and separated in a backwardly moved state, and thus, they may be separated while rotating without contacting the carvings already molded on the parting line. Accordingly, scratch problems, etc., do not occur on the carvings formed on the parting line, and as a result, the carvings may be formed uniformly over the entire 360-degree outer surface of the glass container, thereby enhancing the aesthetics of the glass container.

Although the specification has been described with reference to the embodiments illustrated in the drawings so that those skilled in the art may easily understand and reproduce the present disclosure, this is merely an example, and those skilled in the art will understand that various modifications and equivalent other embodiments may be made from the embodiments of the present disclosure. Therefore, the scope of the present disclosure should be determined by the claims.

The invention claimed is:

1. A mold for manufacturing a glass container including a left mold and a right mold, wherein the left mold includes a left fixed mold; and a left separated mold positioned on a side surface of the left fixed mold, the right mold includes a right fixed mold; and a right separated mold positioned on a side surface of the right fixed mold, the left separated mold is movable forwardly and backwardly while the left fixed mold is stationary, and the right separated mold is movable forwardly and backwardly while the right fixed mold is stationary, a left driving pin through-hole is formed in a vertical direction in the left separated mold, a right driving pin through-hole is formed in the vertical direction in the right separated mold, a left driving pin is movable up and down in a state in which the left driving pin penetrates through the left driving pin through-hole, a right driving pin is movable up and down in a state in which the right driving pin penetrates through the right driving pin through-hole the left driving pin includes a left driving first guide portion; a left driving second guide portion positioned below the left driving first guide portion at a constant interval in the vertical direction; and a left driving connection portion connecting the left driving first guide portion and the left driving second guide portion, the right driving pin includes a right driving first guide portion; a right driving second guide portion positioned below the right driving first guide portion at a constant interval in the vertical direction; and a right driving connection portion connecting the right driving first guide portion and the right driving second guide portion, an upper end surface of the left driving connection portion is connected to a portion of a lower end surface of the left driving first guide portion but is connected to a portion of the lower end surface of the left driving first guide portion that is inclined forwardly, a lower end surface of the left driving connection portion is connected to a portion of an upper end surface of the left driving second guide portion but is connected to a portion of the upper end surface of the left driving second guide portion that is inclined backwardly, an upper end surface of the right driving connection portion is connected to a portion of a lower end surface of the right driving first guide portion but is connected to a portion of the lower end surface of the right driving first guide portion that is inclined forwardly, and a lower end surface of the right driving connection portion is connected to a portion of an upper end surface of the right driving second guide portion but is connected to a portion of the upper end surface of the right driving second guide portion that is inclined backwardly.

2. The mold of claim 1, wherein the left mold further includes a left bottom portion extending downwardly from the left fixed mold and positioned below the left fixed mold and the left separated mold, the right mold further includes a right bottom portion extending downwardly from the right fixed mold and positioned below the right fixed mold and the right separated mold, a left driving pin bottom through-hole is formed in the left bottom portion in the vertical direction and the left driving second guide portion is inserted into the left driving pin bottom through-hole so as to be movable up and down, the lower end surface of the left driving second guide portion is maintained in close contact with a first elastic member in a state in which the first elastic member is positioned at the low part of the left driving pin bottom through-hole, a right driving pin bottom through-hole is formed in the right bottom portion in the vertical direction, so that the right driving second guide portion is inserted into the right driving pin bottom through-hole so as to be movable up and down, and the lower end surface of the right driving second guide portion is maintained in close contact with a second elastic member in a state in which the second elastic member is positioned at the low part of the right driving pin bottom through-hole.

3. The mold of claim 2, wherein the left separated mold is moved forwardly and backwardly in a direction toward an inner center formed in a state in which the left mold and the right mold are combined, and the right separated mold is moved forwardly and backwardly in the direction toward the inner center formed in the state in which the left mold and the right mold are combined, the left driving connection portion is formed in a polygonal shape, a portion of the left driving pin through-hole formed on an inner side of the left separated mold is configured in a shape corresponding to the polygonal shape of the left driving connection portion, the right driving connection portion is formed in a polygonal shape, a portion of the right driving pin through-hole formed on an inner side of the right separated mold is configured in a shape corresponding to the polygonal shape of the right driving connection portion, the left separated mold is positioned on both sides of the left fixed mold, and the right separated mold is positioned on both sides of the right fixed mold.

* * * * *